United States Patent [19]

Subherwal

[11] Patent Number: 4,895,513
[45] Date of Patent: Jan. 23, 1990

[54] HEAT RESISTANT COMBUSTION ELEMENT

[75] Inventor: Bodh R. Subherwal, Huntington Beach, Calif.

[73] Assignee: BR Laboratories, Inc., Huntington Beach, Calif.

[21] Appl. No.: 229,048

[22] Filed: Aug. 5, 1988

Related U.S. Application Data

[63] Continuation-in-part of Ser. No. 82,162, Aug. 6, 1987, abandoned, which is a continuation-in-part of Ser. No. 907,929, Sep. 16, 1986, abandoned, which is a continuation-in-part of Ser. No. 803,183, Dec. 2, 1985, abandoned.

[51] Int. Cl.$^4$ .............................................. F23D 14/12
[52] U.S. Cl. .................................... 431/328; 428/408; 428/375; 427/255.6; 427/228; 427/387
[58] Field of Search ................................ 431/328, 326; 126/92 AC; 428/375, 408; 427/255.6, 228, 294, 374.6, 374.4, 387

[56] References Cited

U.S. PATENT DOCUMENTS

| | | | |
|---|---|---|---|
| 4,067,956 | 1/1978 | Franklin et al. | 423/445 |
| 4,252,520 | 2/1981 | Bratko | 431/328 |
| 4,280,329 | 7/1981 | Rackley et al. | 431/328 X |
| 4,588,373 | 5/1986 | Tonon et al. | 431/328 |
| 4,621,017 | 11/1986 | Chandler et al. | 428/408 X |
| 4,668,583 | 5/1987 | Olander | 428/408 |

Primary Examiner—Randall L. Green
Attorney, Agent, or Firm—Nilsson, Robbins, Dalgarn, Berliner, Carson & Wurst

[57] ABSTRACT

A process of making a combustion element and the resultant element which includes heating a body of felted graphite fibers to a temperature of between 1500 degrees and 2100 degrees F. in an inert atmosphere and thereafter contacting the body at the elevated temperature with an atmosphere of a decomposable gaseous source of silicon atoms for a time and at a concentration to in situ convert the graphite fibers to silicon fibers and silicon carbide fibers.

9 Claims, 1 Drawing Sheet

HEAT RESISTANT COMBUSTION ELEMENT

CROSS-REFERENCE TO RELATED APPLICATION

This application is a continuation-in-part of application Ser. No. 07/082,162, filed Aug. 6, 1987, abandoned which is a continuation-in-part of application Ser. No. 907,929, filed Sept. 16, 1986, abandoned, which is a continuation-in-part of application Ser. No. 803,183, filed Dec. 2, 1985, abandoned.

FIELD OF THE INVENTION

This field relates to burner units for use in the combustion of fuels. More particularly, this invention relates to gas-permeable elements which provide for substantially flameless combustion of fuel and air mixtures.

BACKGROUND OF THE INVENTION

Gas-permeable elements for the flameless combustion of gaseous fuels have been used in portable and stationary heaters where transportable and substantially instantaneous sources of heat were required. Such elements have traditionally comprised ceramic fiber matrices containing appropriate metal catalysts. However, these elements have proven to be fragile and have tended to become cracked and their fibers broken off in use. Further, such elements have generally required careful control over the fuel-air mixture and flow rate minimize carbon monoxide production and to avoid either flashback of the combustion process into the gas supply chamber or blowout of the combustion reaction. Additionally, these combustion elements can only produce maximum heat outputs between 300 to 500 BTU/hr.in.$^2$ which require substantial pressure differentials across the element and are limited to maximum operating temperatures of up to approximately 2100 degrees F. in order to avoid melt-down of the elements themselves.

The best prior art known to Applicant representative of such burners are U.S., Pat. Nos. 3,322,179.; 3,367,149; 4,588,373; 4,067,956; 3,832,122; 4,280,329; and 4,252,520.

SUMMARY OF THE INVENTION

The present invention comprises the process of making a porous fluid permeable felted combustion element by heating a body of felted carbon fibers in a non-oxidizing atmosphere to a temperature of between 1500 degrees and 2100 degrees F. and thereafter contacting said body at said elevated temperature with an atmosphere of a heat decomposable silicon containing gaseous compound and hydrogen for a period of time sufficient to in situ convert substantially all of said carbon fibers to silicon and silicon carbide fibers. The present invention also includes the combustion element made by the foregoing process. Further, the invention comprises a combustion system for using a combustion element having a porous fluid-permeable felted structure made by the foregoing process and a method for operating such a combustion system including the steps of mixing fuel and air, flowing the mixture through the element and combusting the mixture on the surface of the element as the mixture flows out from it.

Among other things, the combustion element of the present invention is highly resistant to dimensional changes and cracking or breaking resulting from fluid flow and temperature changes. Further, the element and method for combustion allow substantial fluid flow at low pressure differentials without blowout, and allow combustion at very high temperatures without thermal damage to the element or flashback.

DESCRIPTION OF THE PREFERRED EMBODIMENT

Figure 1:
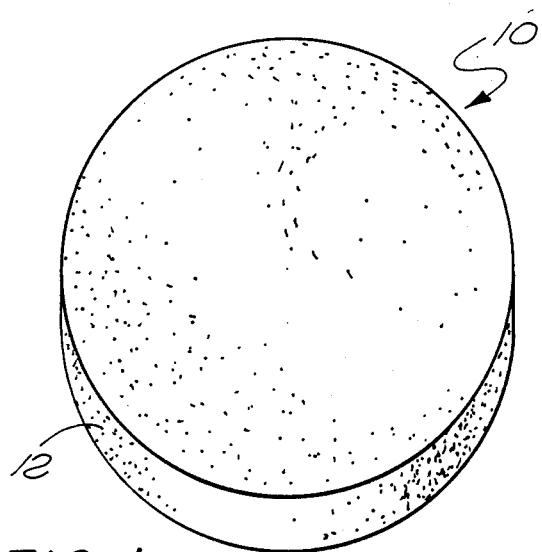
FIG. 1 is a perspective view of a combustion element in accordance with the present invention.

A body of felted carbon fibers are the preferred starting materials for making the combustion element of the present invention. The term carbon fibers is intended to include graphite fibers.

The body of felted carbon fibers is heated within an appropriate enclosure in a non-oxidizing atmosphere such as a nitrogen atmosphere to a temperature of between 1500 degrees–2100 degrees F. for a time to stabilize the fiber temperatures at the elevated level. Thereafter the nitrogen atmosphere is replaced by passing through the enclosure a gas comprising a heat decomposable source of silicon such, for example, as silicon tetrachloride, methyltrichlorosilane or some other organosilane in a hydrogen carrier. This gas is passed through the enclosure for a period of time sufficient to decompose the gas and cause an in situ conversion of the carbon fibers to silicon and silicon carbide fibers.

The resultant body is a heat resistant material capable of resisting the effects of high temperatures, rapid temperature changes and large temperatures gradients.

For example, as above described, a combustion element composed of silicon and silicon carbide fibers may be formed by exposing a body of carbon fibers to an atmosphere of hydrogen containing methyltrichlorosilane while being maintained at temperature conditions of 1500 degrees to 2100 degrees F. and pressure conditions of 1 to 3 psi. The preferred procedure is to heat the body of carbon fibers to the requisite temperature in a conventional batch-type pressure sealed electric furnace in a nitrogen or other inert or non-oxidizing atmosphere. The atmosphere containing one (1) part methyltricholorosilane to four (4) to twenty (20) parts hydrogen (by volume) is the substituted for the nitrogen atmosphere in the furnace and allowed to fully permeate the structure of the carbon fiber body. The carbon fiber body is allowed to remain in contact with the methyltrichlorosilane for a period of about two hours to about ten hours, during which period the methyltrichlorosilane decomposes depositing silicon on the carbon fibers which in turn reacts therewith resulting in the in situ transformation of the carbon fibers to silicon fibers and silicon carbide fibers throughout the structure of the body.

In accordance with a specific example 15 bodies of graphite fibers in random felt form each having a dimension of 2.25 inches in diameter by 0.5 inches thick were inserted into a furnace. The furnace was flushed with nitrogen until a substantially pure nitrogen atmosphere was obtained. Thereafter while maintaining the nitrogen atmosphere the furnace was sealed and then the temperature within the furnace was raised and maintained until the temperature of the graphite fibers was stabilized at approximately 1900 degrees F. Thereafter the nitrogen atmosphere was replaced with an atmosphere of about one (1) parts methyltrichlorosilane to fifteen (15) parts hydrogen (by volume) while maintaining the temperature of the fibers at 1900 degrees F. Preferably the hydrogen methyltrichlorosilane mixture is pre-heated to about 550 degrees F. The methyltrichlorosilane hydrogen atmosphere was continuously flowed through the furnace and thereby maintained in contact with the fibers heated to 1900 degrees F. for a period of two (2) hours.

The fibers were cooled and then removed from the furnace for use as a combustion element in a gas burner. The cooling was effected by first passing nitrogen through the furnace to remove hydrogen and excess methyltrichlorosilane silicon therefrom and then allowing the bodies to cool in air.

In accordance with another example 24 bodies of graphite fibers in random felt form having dimensions of 2.5 inches in diameter by 0.5 inches in thickness were processed as above defined except that the hydrogen six (6) parts methyltrichlorosilane one (1) part atmosphere was maintained for 2.5 hours after which the heat was removed from the fibers allowing them to cool and then be removed from the furnace and used as a combustion element in a burner.

Combustion elements constructed as above described have been used in burners continuously for in excess of 7000 hours in air at temperatures of between 2000 degrees F. and 2200 degrees F. without damage to the combustion element.

Fibers from combustion elements constructed as above described have been analyzed by x-ray diffraction with the result that the predominant materials were shown to be beta silicon carbide with a very small amount of alpha silicon carbide and silicon. There was no evidence of free carbon or of silicon in crystalline form. Further analysis was conducted on the fibers using a Hitachi TEM/SEM electron microscope with Kerex microprobe for elemental analysis with the SEM capability of the microscope being used. This analysis provides results which indicate that the fiber is completely silicon and silicon carbide with the results being the same at the center of the fiber as at the outside of the fiber. It would appear from the results and the durability of the combustion elements that the resulting fibers are stoichiometric silicon carbide and silicon.

The combustion elements constructed as above described may be efficiently used to burn natural gas, liquified petroleum gas, methane, butane, digestion or town gas.

Figure 2:
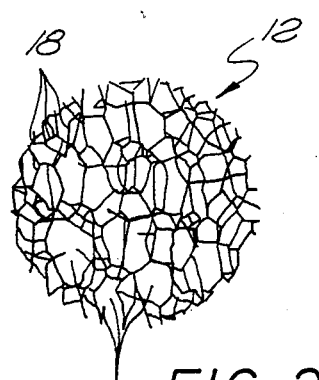
FIG. 2 is an enlarged view of the structure of the combustion element of FIG. 1.

Referring now to FIG. 1, a combustion element 10 in accordance with the present invention is illustrated. The combustion element 10 is composed of in situ formed fibers of silicon carbide extending on and throughout the element and thereby forming a heat resistant structure 12. The structure of the combustion element replicates the geometry and structure of the body of graphite fibers used to make it. Referring now to FIG. 2, an enlarged microscopic view of the structure 12 of the element is shown. The structure 12 of the combustion element is characterized by a large number of pores 16 and a pattern of interconnected multidimensional fibers 18.

Figure 3:
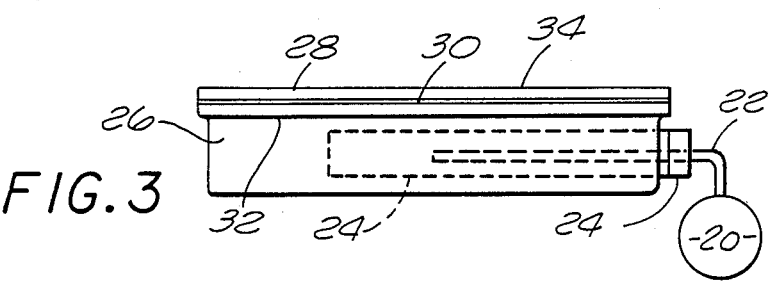
FIG. 3 is a side view of a burner unit incorporating the present invention.

Referring now to FIG. 3, one form of a burner unit incorporating the present invention is illustrated. The burner unit comprises a source of pressurized gaseous carbonaceous fuel 20 which may constitute a conventional industrial or household source of natural gas or propane, an injection nozzle 22 for the fuel, an inlet pipe 24 for air, a distribution chamber 26 for the fuel-air mixture and the combustion element 28 held in place by Kao wool gasket material 30 and metal lip 32. In operation, fuel from source 20 is injected into pipe 24 through nozzle 22 by the natural pressure thereof where the fuel mixes with air drawn in from the atmosphere by venturi action through the pipe 24 to form a combustible mixture. The fuel-air mixture is then distributed into chamber 26 and flows through combustion element 28 to surface 34. Combustion takes place across the surface 34 of the element. A burner constructed as illustrated in FIG. 3 may typically be used in a residential application such as for space heating or as a burner on a cooking stove.

Figure 4:
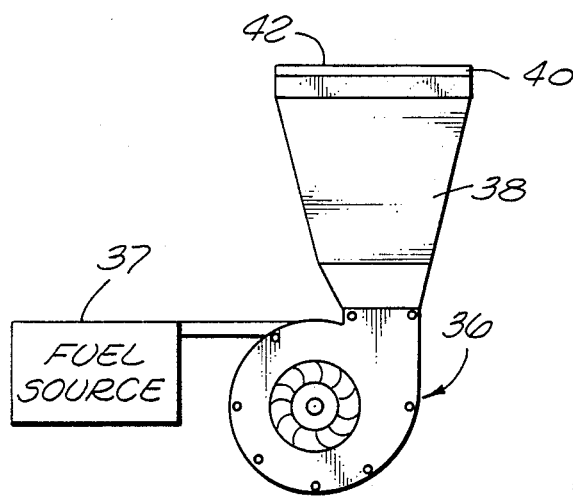
FIG. 4 is a side view of a forced draft burner unit incorporating the present invention.

Referring now to FIG. 4, another burner unit incorporating the present invention is shown. A burner of the type shown in FIG. 4 utilizes a forced draft of a gas-air mixture to the combustion element 40. This type of burner is more adaptable to industrial or commercial use than is the configuration of FIG. 3. Blower 36 pumps fuel from a source 37 along with air from the atmosphere as is well known and delivers the fuel and air as a mixture into a sealed distribution chamber 38. From there the mixture flows through combustion element 40 to where combustion takes place on surface 42 of the element. The forced draft effected by blower 36 allows for much higher flow rates, higher temperatures and more heat output. Also, by proper adjustment of the fuel-air mixture, more efficient burning is realized with resultant improved heat output.

Figure 5:
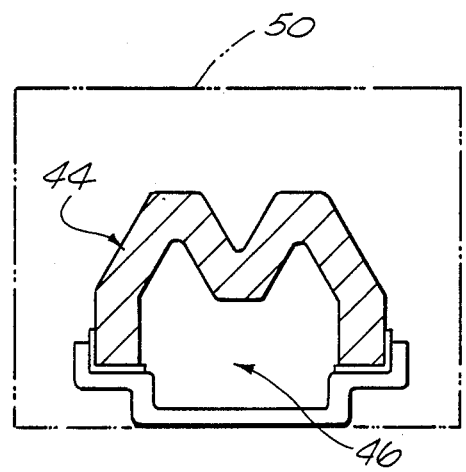
FIG. 5 is a cross-sectional view of a specially shaped element in accordance with the present invention.

Referring now to FIG. 5, a specially shaped combustion element 44 is shown. This combustion element 44 if formed into an inverse "W" shape which may be useful where the width of the combustion chamber 46 is limited yet more combustion surface and heat output are desired. It is one of the advantages of the present invention that the combustion element may be formed to almost any geometric configuration which may be useful.

The combustion element 44, or a multiplicity of them as above described, or in any desired shape or configuration may be disposed within an enclosure as depicted by the dashed line 50, FIG. 5. Such an enclosure may take many forms in different heating devices such as the combustion chambers of a boiler, a furnace, the walls of a crucible for melting metals or the like. Particularly useful in such applications are forced draft burners of the type shown in FIG. 4.

In operation, the combustion element of the present invention allows large fluid flow rates with low pressure differentials. For example, with a pressure differential of one inch of water, a silicon carbide element of one inch thickness constructed as above described will allow an air and natural gas flow of approximately 700 cubic feet per minute. These larger fluid flow rates allow substantial quantities of fuel-air mixture to be supplied to the surface of the element for combustion. Combustion takes place across and along the surface of the element as the fuel-air mixture flows out from the combustion element. The overall structure has very low thermal conductivity of generally less than 2 BTUin.-hr.-ft.$^2$-degrees F. so that the inner material of the combustion element forms a heat insulation barrier. During operation, although the combustion surface of the element may be at 2000 degrees to 2200 degrees F., the opposite surface which may be, for example, only ¾ inch away will generally be at 90 degrees to 100 degrees F. This sharp temperature gradient helps to stabilize combustion on the appropriate surface of the burner and prevents flashbacks. Combustion may take place at very high temperatures of approximately 2800 degrees F. These temperatures are well above the operating limit of approximately 2100 degrees F. characteristic of ceramic combustion elements. The larger flow rates and high temperatures permissible with use of the present invention in turn allow very high heat outputs of up to approximately 2000 BTUhr.-in.$^2$. Despite these severe conditions of temperature and flow, the combustion element of the present invention retains its structural integrity, resists cracking and breaking and exhibits only nominal dimensional changes due to temperature variations. Further, under normal operating conditions, the combustion element of the present invention promotes efficient combustion. Due to the properties of the combustion element and rapid energy transfer from the combustion surface of the element caused by the flow of reactants and high radiant heat output, the combustion process is controlled permitting operation at high efficiencies.

The combustion efficiencies realized when using a combustion element constructed in accordance with the present invention provide substantial energy savings. For example, a commercial cooking griddle having a burner using a combustion element had an efficiency of 81%, as compared to 65% for a griddle normally used. A crucible for melting aluminum in 150 pound quantities was increased in its efficiency from 12% to 24%. A surprising result is that a burner constructed with the combustion element of the present invention is extremely low in unwanted emissions. For example, emissions from a furnace using a burner constructed from combustion elements constructed in accordance with the present invention include 9%–11% carbon dioxide, 10–20 parts per million carbon monoxide and 5–10 parts per million oxides of nitrogen when using natural gas as the fuel supply.

While the system of this invention has been described in conjunction with the above embodiments, it should be apparent that changes can be made without departing from the principles of the invention.

What is claimed is:

1. A method for producing a combustion element through which an air-fuel mixture may flow and across the surface of which substantially flameless combustion may take place as the mixture flows out from the element, comprising the steps of:
   providing a body of felted carbon fibers having a structure of interconnected, multidimensional randomly disposed strands;
   heating said body in an atmosphere of an inert gas to a temperature of between 1500 degrees and 2100 degrees F.;
   maintaining said body of fibers at said temperature;
   passing a gas including a heat decomposable source of silicon atoms through said body of heated fibers for a period of time sufficient to in situ convert substantially all of said fibers to silicon carbide and silicon; and
   cooling said converted body of fibers.

2. The method of claim 1 wherein said heated carbon fiber body is exposed to a vapor phase material comprising an organosilane at temperature conditions of between 1500 degrees to 2100 degrees F. and under pressure conditions of between 1 to 3 psi.

3. The method of claim 2 wherein said carbon body is exposed to a vapor phase material comprising methyltrichlorosilane at temperature conditions of between 1500 degrees to 2100 degrees F. and under pressure conditions between 1 to 3 psi.

4. The method of claim 3 wherein said carbon body is exposed to a vapor phase material comprising methyltrichlorosilane and hydrogen in a ratio of 1 to between 4 and 20, respectively, for a period of between 2 and 10 hours.

5. The method of claim 4 wherein said cooling step includes passing an inert gas through said converted fiber body.

6. A combustion element, comprising:
   a felted porous structure of randomly disposed fibers including a heat resistant material through which an air-fuel mixture may flow and on the surface of which combustion may take place as the mixture flows out from the combustion element, said structure formed by the process of:
   exposing a body of felted carbon fibers to an inert atmosphere and heating said fibers to a temperature of between 1500 degrees to 2100 degrees F.,
   while maintaining said temperature, passing a heat decomposable gaseous source of silicon atoms through said body of heated fibers for a period of time sufficient to in situ convert substantially all of said fibers to silicon carbide and silicon, and
   cooling said converted body of fibers.

7. The combustion element of claim 6 wherein said heat resistant material is substantially silicon carbide and said source includes methyltrichlorosilane.

8. A combustion system, comprising:
   a blower means for providing a forced-draft of a fuel-air mixture;
   a combustion element having a felted porous structure of randomly disposed fibers of a heat resistant material formed by the process of:
   exposing a body of felted carbon fibers to an inert atmosphere and heating said fibers to a temperature of between 1500 degrees and 2100 degrees F.,
   while maintaining said temperature, passing a heat decomposable gaseous source of silicon atoms through said body of heated fibers for a period of time sufficient to in situ convert substantially all of said fibers to silicon carbide and silicon, and
   cooling said converted body of fibers; and
   chamber means for conducting the draft of the fuel-air mixture from the blower means to the combustion element.

9. A combustion system comprising:
   a source of gaseous fuel;
   a source of air;
   means for mixing said air and fuel to form a combustible mixture;
   a combustion element having a felted porous structure of randomly disposed fibers of a heat resistant material formed by the process of:
   exposing a body of felted carbon fibers to an inert atmosphere and heating said fibers to a temperature of between 1500 degrees and 2100 degrees F., while maintaining said temperature, passing a heat decomposable gaseous source of silicon atoms through said body of heated fibers for a period of time sufficient to in situ convert substantially all of said fibers to silicon carbide and silicon, and cooling said converted body of fibers; and means for passing said fuel-air mixture through said combustion element.

* * * * *